US012689162B2

(12) United States Patent
Feng et al.

(10) Patent No.: US 12,689,162 B2
(45) Date of Patent: Jul. 21, 2026

(54) CONNECTOR AND CONNECTOR ASSEMBLY

(71) Applicant: Tyco Electronics (Shanghai) Co., Ltd., Shanghai (CN)

(72) Inventors: Qi Feng, Shanghai (CN); Yuchen Yang, Shanghai (CN); Ziwei (Vivi) Li, Shanghai (CN); Xiao (Nichee) Zhou, Shanghai (CN)

(73) Assignee: Tyco Electronics (Shanghai) Co., Ltd., Shanghai (CN)

( * ) Notice: Subject to any disclaimer, the term of this patent is extended or adjusted under 35 U.S.C. 154(b) by 308 days.

(21) Appl. No.: 18/489,946

(22) Filed: Oct. 19, 2023

(65) Prior Publication Data

US 2024/0136775 A1 Apr. 25, 2024
US 2024/0235129 A9 Jul. 11, 2024

(30) Foreign Application Priority Data

Oct. 19, 2022 (CN) ......................... 202222754357.1

(51) Int. Cl.

*H01R 13/6592* (2011.01)
*H01R 9/05* (2006.01)
*H01R 13/52* (2006.01)
*H01R 103/00* (2006.01)

(52) U.S. Cl.

CPC ....... *H01R 13/6592* (2013.01); *H01R 9/0524* (2013.01); *H01R 13/5202* (2013.01); *H01R 2103/00* (2013.01); *H01R 2201/10* (2013.01)

(58) Field of Classification Search

CPC ............ H01R 13/6592; H01R 13/5202; H01R 9/0524; H01R 2103/00; H01R 2201/10
USPC ..................................................... 439/607.52
See application file for complete search history.

(56) References Cited

U.S. PATENT DOCUMENTS

| | | | | |
|---|---|---|---|---|
| 8,454,385 | B2 * | 6/2013 | Chawgo | H01R 13/58 439/271 |
| 9,425,564 | B2 * | 8/2016 | Yamaguchi | H01R 24/40 |
| 10,348,003 | B2 * | 7/2019 | Singhammer | H01R 13/514 |

FOREIGN PATENT DOCUMENTS

| | | | | |
|---|---|---|---|---|
| CN | 109361096 B | * | 7/2020 | H01R 13/5205 |
| CN | 112864697 A | * | 5/2021 | H01R 24/00 |
| CN | 114914744 A | * | 8/2022 | H01R 13/73 |

* cited by examiner

*Primary Examiner* — Gary F Paumen
(74) *Attorney, Agent, or Firm* — Barley Snyder

(57) ABSTRACT

A connector comprises a housing in a form of a bent tube. The housing includes a first tubular portion, a second tubular portion, and a bent portion connected between the first tubular portion and the second tubular portion. The first tubular portion and the second tubular portion extend at an angle of more than 0 degree and less than 180 degrees relative to each other. The housing is adapted to hold a cable extending through an interior thereof, wherein the cable is bent within the bent portion.

20 Claims, 5 Drawing Sheets

CONNECTOR AND CONNECTOR ASSEMBLY

CROSS-REFERENCE TO RELATED APPLICATION

This application claims the priority of Chinese Patent Application No. CN 202222754357.1 filed on Oct. 19, 2022, the whole disclosure of which is incorporated herein by reference.

FIELD OF THE INVENTION

The present disclosure relates to a connector and a connector assembly.

BACKGROUND

In modern electric vehicles, a power bolt-type connector is a very important component, which is generally used to connect a power supply and a motor to transmit electric energy from the power supply to the motor. Due to the increasingly strict requirements for the internal wiring of these vehicles, the power bolt-type connector is required to have different angles of output directions and a simpler structure, so that the occupied space will be smaller and the cost will be reduced.

Existing power bolt-type connectors typically have a 180-degree straight line output direction, which leads to the need to bend a cable if a 90-degree direction is required for later wiring. For thicker cables, it is necessary to reserve a larger bending radius, resulting in occupying more space, which is obviously a great waste for the internal space of the motor. In addition, if the cables are bent manually, the consistency of the products will decrease, and even the rejection rate will increase. Further, as this type of connector is a high-voltage and high-current connector, it is also necessary for this type of connector to have functions such as shielding, insulation, waterproof, and electric shock prevention. Moreover, the number of parts in the connector in the prior art is enormous, and the assembly is complicated, resulting in cost higher.

SUMMARY

According to an embodiment of the present disclosure, a connector comprises a housing in a form of a bent tube. The housing includes a first tubular portion, a second tubular portion, and a bent portion connected between the first tubular portion and the second tubular portion. The first tubular portion and the second tubular portion extend at an angle of more than 0 degree and less than 180 degrees relative to each other. The housing is adapted to hold a cable extending through an interior thereof, wherein the cable is bent within the bent portion.

BRIEF DESCRIPTION OF THE DRAWINGS

The invention will now be described by way of example with reference to the accompanying Figures, of which.

DETAILED DESCRIPTION OF THE EMBODIMENTS

Figure 1:
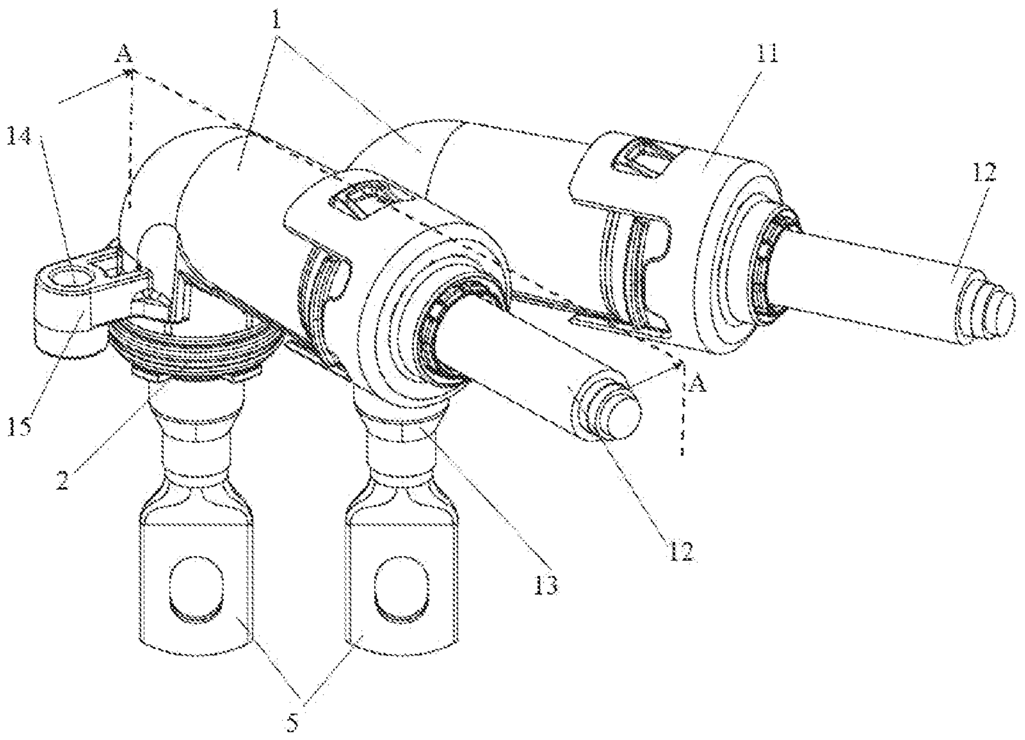
FIG. 1 is a perspective view of a connector according to an embodiment of the present disclosure.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

With reference to FIGS. 1-5, an embodiment of an aspect of the present disclosure provides a connector comprising a housing 1 in a form of a bent tube. The housing 1 comprises a first tubular portion 101, a second tubular portion 102 and a bent portion 103. The bent portion 103 is connected between the first tubular portion 101 and the second tubular portion 102, so that the first tubular portion and the second tubular portion extend at an angle of more than 0 degree and less than 180 degrees relative to each other. The housing 1 is adapted to hold a cable 12 extending through the interior of the housing, so that the cable is bent within the bent portion 103.

The housing 1 is made of conductive material, preferably metal such as aluminum alloy and stainless steel. In one embodiment, the housing is made of aluminum alloy. However, in other embodiments, the housing can also be made of non-metallic materials such as plastic.

In the illustrated embodiment, the bent portion 103 is bent at an angle of 90 degrees, so that the cable 12 held in the housing is bent at an angle of 90 degrees inside the housing 1. However, according to the conditions of specific applications, the bent portion 103 can be bent at an acute angle less than 90 degrees, such as 30 degrees, 45 degrees, 60 degrees, etc., or can be bent at an obtuse angle greater than 90 degrees, such as 120 degrees, 135 degrees, 150 degrees and other angles, which are not limited in this application.

Figure 3:
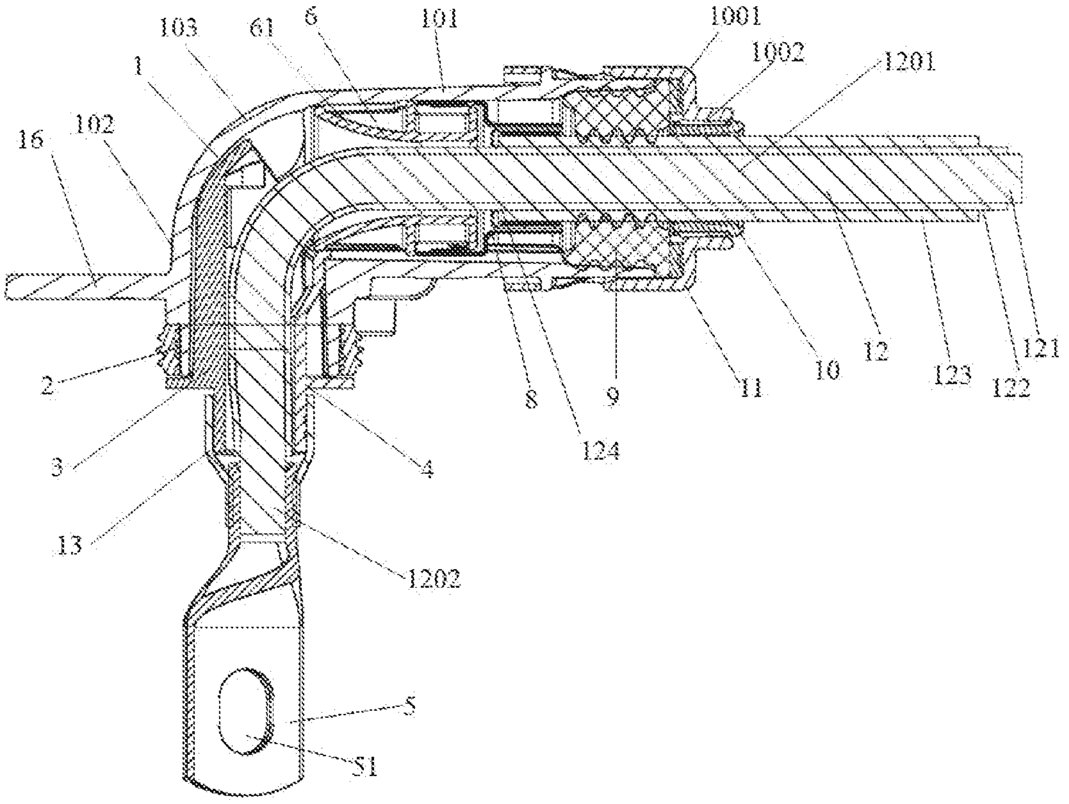
FIG. 3 is a cross-sectional view of the connector shown in FIG. 1 taken along line A-A.
Figure 4:
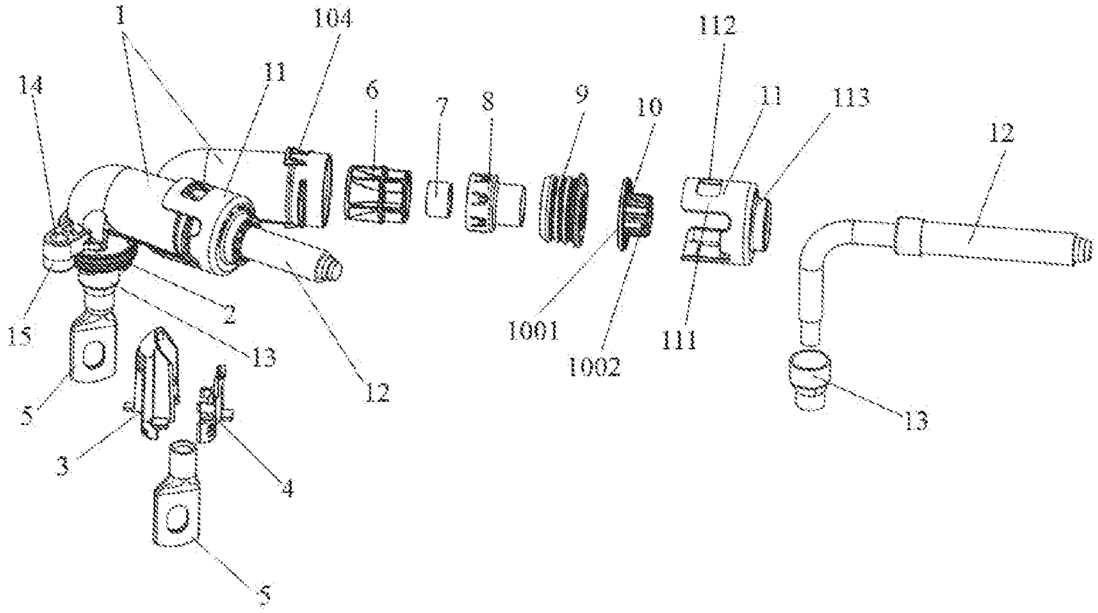
FIG. 4 is a partially exploded view of a connector according to an embodiment of the present disclosure.

As better shown in FIGS. 3 and 4, the cable 12 adapted to be accommodated in the housing 1 comprises a conductive core 121 and a first insulating layer 122 wrapped on the conductive core. The housing 1 is adapted to allow the conductive core 121 and the first insulating layer 122 to extend through the interior of the housing 1. In this way, the housing 1 is electrically isolated from the conductive core 121 by the first insulating layer 122.

As better shown in FIGS. 3 and 4, in one embodiment, the cable 12 can further comprises a second insulating layer 123 wrapped on the first insulating layer 122, and a shielding layer 124 located between the first insulating layer 122 and the second insulating layer 123. In the illustrated embodiment, the extension of the second insulating layer 123 is terminated in the first tubular portion 101. Thus, the shielding layer 124 is exposed at a terminating portion of the end of the second insulating layer 123 and folded to be sleeved over the outer peripheral surface of the second insulating layer 123.

Figure 5:
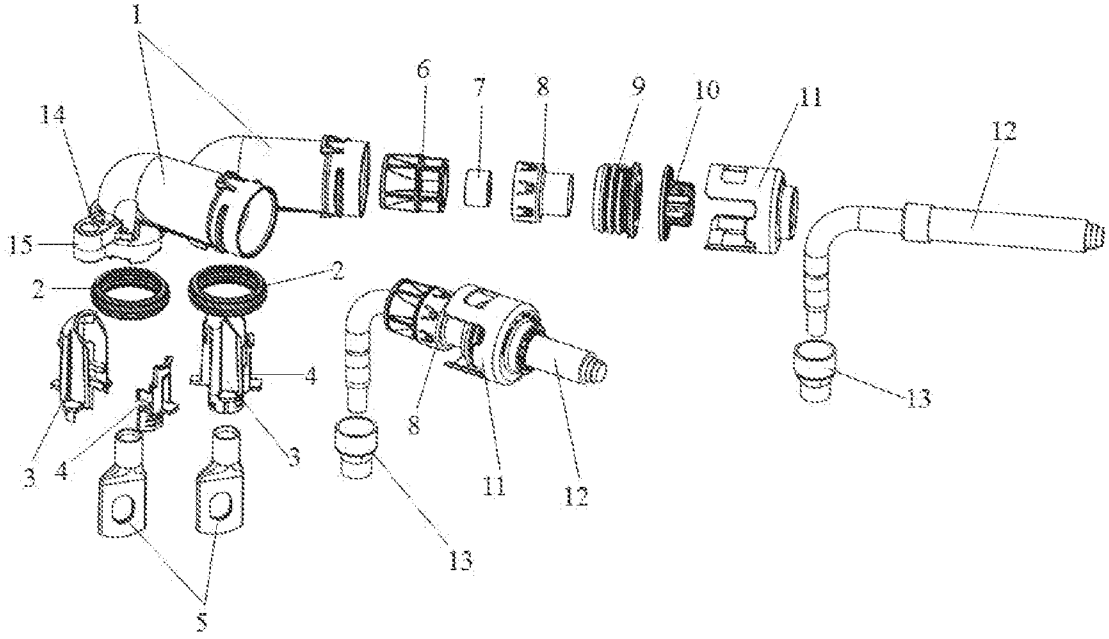
FIG. 5 shows a fully exploded view of a connector according to an embodiment of the present disclosure.

As better shown in FIGS. 3-5, the connector further comprises a sheath 11 which is adapted to be sleeved over an outer peripheral surface of an end of the first tubular portion 101 and over an outer peripheral surface of the cable 12 held in the housing. The sheath 11 is adapted to hold the cable relative to the first tubular portion and prevent other components inside the housing 1 from detaching from the housing through an opening at the end of the first tubular portion 101. In the illustrated embodiment, the sheath 11 comprises an annular wall 111 adapted to be sleeved over the outer peripheral surface of the first tubular portion 101 and a cover portion 113 adapted to partially close the opening at the end of the first tubular portion 101. The cover portion 113 is configured to have a through hole adapted to be passed through by the cable 12.

As better shown in FIG. 4, an engaging opening 112 is formed in the annular wall 111. A protrusion 104 is formed on the outer peripheral surface of the first tubular portion 101. The sheath 11 is adapted to be fixed to the first tubular portion 101 through engagement between the engaging opening 112 and the protrusion 104.

In the illustrated preferred embodiment, the connector further comprises a first clamping member 10 accommodated in the sheath 11. The first clamping member comprises an annular portion 1002 adapted to be sleeved over the outer peripheral surface of the cable 12 and a flange 1001 adapted to extend radially outward from the annular portion 1002. The annular portion 1002 is adapted to be positioned between the outer peripheral surface of the cable 12 and the inner edge of the through hole of the cover portion 113 of the sheath to clamp the cable 12, thereby preventing the cable 12 from moving relative to the first tubular portion 101. The flange 1001 is adapted to abut against the inner surface of the cover portion 113 of the sheath, so as to prevent the first clamping member 10 from being axially and outwardly detached from the sheath 11.

As better shown in FIGS. 3-5, in one embodiment, the connector further comprises a first seal 9, which is tightly positioned between the inner surface of the first tubular portion 101 and the outer peripheral surface of the cable 12 held in the housing 1 to seal the interior of the first tubular portion 101 from the external environment of the connector. This prevents foreign matters such as water and pollutants from entering the inner space of the housing of the connector. In one embodiment, the flange 1001 of the first clamping member 10 is positioned axially between the inner surface of the cover portion 113 of the sheath 11 and the first seal 9.

The sheath 11, the first clamping member 10 and the first seal 9 are combined together at the end of the first tubular portion 101 so as to fix the cable 12 held in the housing 1. This arrangement precents other components inside the housing 1 from detaching from the housing through the opening at the end of the first tubular portion 101, and hermetically separates the interior of the housing 1 from the exterior of the connector.

In the illustrated example, the connector can further comprise shielding rings 7, 8 inside the first tubular portion 101. The shielding rings 7, 8, are adapted to contact a portion of the shielding layer 124 exposed at the terminating portion of the end of the second insulating layer 123. The outer surfaces of the shielding rings are adapted to contact the inner surface of the first tubular portion 101.

The shielding rings 7, 8 are made of conductive material, so that the shielding layer 124 of the cable 12 and the housing 1 made of conductive material have the same electric potential. In addition, the housing 1 of the connector, which is made of conductive material, is connected with a motor housing, in the illustrated example, through the lug 15 on the housing 1 and fasteners such as bolts. As a result, the shielding layer 124 of the cable 12 and the housing 1 of the connector have the same electric potential as the motor housing, thereby realizing the overall shielding function.

In the illustrated example, the shielding rings 7, 8, can comprise a first shielding ring 8 and a second shielding ring 7 adapted to be sleeved in the first shielding ring. The portion of the shielding layer 124 exposed at the terminating portion of the end of the second insulating layer 123 is adapted to be tightly clamped between the first shielding ring 8 and the second shielding ring 7.

The first shielding ring 8 comprises a first cylindrical portion and a second cylindrical portion extending in the axial direction. The diameter of the first cylindrical portion is greater than that of the second cylindrical portion, so that the outer surface of the first cylindrical portion abuts against the inner surface of the first tubular portion 101. The portion of the shielding layer 124 exposed at the terminating portion of the end of the second insulating layer 123 is folded over to be tightly clamped between the second cylindrical portion of the first shielding ring 8 and the second shielding ring 7, as shown in FIG. 3.

In the illustrated preferred embodiment, the connector further comprises a spacer 6 located in the first tubular portion 101. An end of the spacer 6 facing the bent portion 103 is trumpet-shaped to form a trumpet portion 61. The trumpet portion 61 is adapted to guide the cable 12 held in the housing to extend and bend from the first tubular portion 101 to the second tubular portion 102 at the trumpet portion 61, thereby preventing the first insulating layer 122 of the cable 12 from wearing away at the bent portion 103 of the housing and thus preventing the risk of electric leakage.

Figure 2:
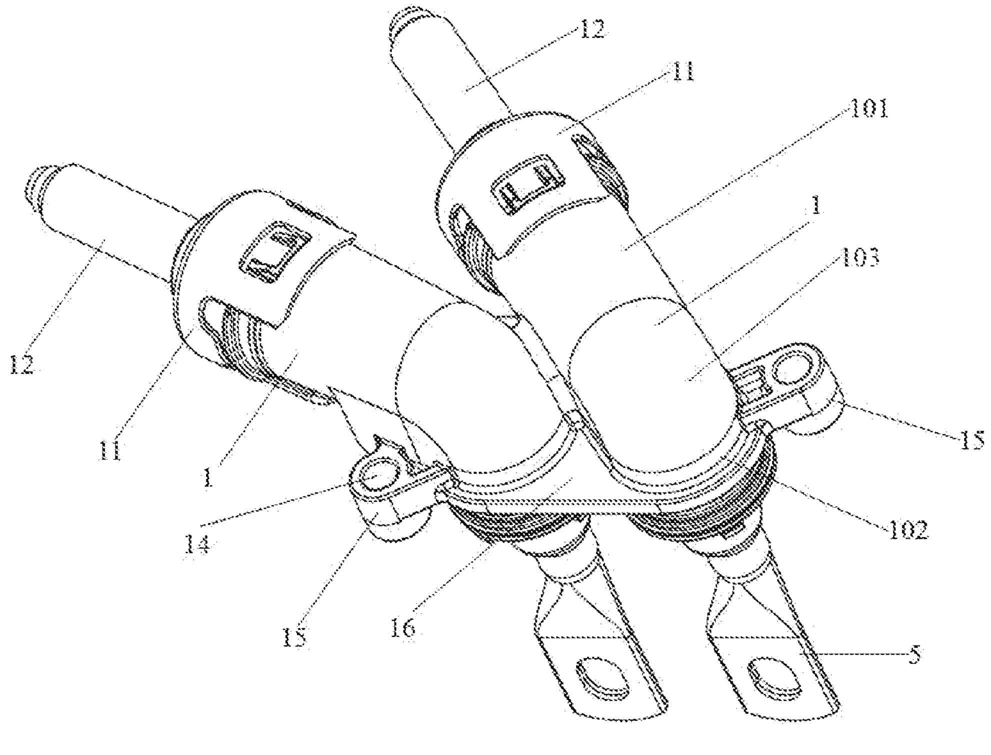
FIG. 2 is another perspective view of the connector shown in FIG. 1.

As better shown in FIGS. 1 and 2, the exterior of the second tubular portion 102 of the housing 1 of the connector is provided with a lug 15 in which a mounting hole 14 is formed. Preferably, the lug 15 is integrally formed with the housing 1 of the connector. The housing 1 is adapted to be fixed to a motor housing by a fastener extending through the mounting hole 14 and a corresponding mounting hole of the motor housing.

As shown in FIGS. 3-5, the connector further comprises a heat shrinkable tube 13, which is adapted to be sleeved over an outer peripheral surface of the end of the second tubular portion 102 and an outer peripheral surface of a connection end 1202 of the cable 12 exiting the second tubular portion 102. This arrangement seals the interior of the second tubular portion 102 from the external environment of the connector, thereby preventing foreign matters such as water and pollutants from entering the inner space of the housing of the connector, and preventing the cable 12 from moving relative to the second tubular portion 102.

The connector may further comprise a connection terminal 5 partially inserted into the heat shrinkable tube 13. The connection terminal is adapted to be electrically connected with the connection end 1202 of the cable 12 exiting the second tubular portion 102 and to be electrically connected to the motor. In the illustrated example, the connection terminal 5 comprises a connection hole 51 penetrating through the connection terminal, and the cable 12 is adapted to be fixed to and electrically connected to the motor by a bolt extending through the connection hole 51.

As better shown in FIGS. 3-5, the connector further comprises a second clamping member 3 and a third clamping member 4 accommodated in the second tubular portion 102. The second clamping member 3 and the third clamping member 4 are adapted to be combined together to clamp a portion of the cable 12 located inside the second tubular portion 102, so as to fix the cable 12 relative to the second tubular portion 102. In the illustrated example, the dimension of the third clamping member 4 in the axial direction of the second tubular portion 102 is smaller than the dimension of the second clamping member 3 in the axial direction of the second tubular portion 102, so that the cable 12 held inside the housing is adapted to go over the third clamping member 4 to extend to the bent portion 103 of the housing and further extend into the first tubular portion 101.

As better shown in FIG. 3, the connector further comprises a second seal 2 sleeved outside the second tubular portion 102, and the second seal is adapted to be fixed between the housing 1 and the motor housing to prevent pollutants from entering the interior of the motor housing.

Another aspect of the present disclosure further provides a connector assembly, which comprises at least two connectors according to the above-mentioned embodiments of the present disclosure. As best shown in FIGS. 1 and 2, at least two connectors are fixed to each other through a connection plate 16.

As better shown in FIG. 2, a first tubular portion of one connector in the connector assembly and a first tubular portion of the other connector in the connector assembly are configured to form an angle relative to each other. According to the conditions of specific applications, the angle can be an acute angle less than 90 degrees, such as 30 degrees, 45 degrees, 60 degrees, etc., or an obtuse angle greater than 90 degrees, such as 120 degrees, 135 degrees, 150 degrees, etc., which are not limited in this application. In the illustrated example, a second tubular portion of the one connector in the connector assembly and a second tubular portion of the other connector in the connector assembly are parallel to each other.

The connector and the connector assembly provided by the present disclosure have a non-linear structure, so that the cable held in the connector housing can be bent and extended therein, thereby reducing space waste. In addition, it realizes a predetermined non-linear wiring direction for the cable through the connector and the connector assembly, thereby increasing product consistency and reducing rejection rate. Moreover, the connector and the connector assembly provided by various embodiments of the disclosure can further provide shielding, insulation, waterproof, electric shock prevention and other functions. The connector and connector assembly comprise fewer parts, which makes the assembly simpler and convenient and has lower cost.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A connector, comprising:

a housing in a form of a bent tube, including:

a first tubular portion;

a second tubular portion; and a bent portion connected between the first tubular portion and the second tubular portion, the first tubular portion and the second tubular portion extending at an angle of more than 0 degree and less than 180 degrees relative to each other, the housing adapted to hold a cable extending through an interior thereof, wherein the cable is bent within the bent portion; and a spacer located in the first tubular portion, an end of the spacer facing the bent portion is trumpet-shaped to form a trumpet portion adapted to guide the cable held in the housing to extend and bend from the first tubular portion to the second tubular portion at the trumpet portion.

2. The connector according to claim 1, wherein the housing is adapted to receive a conductive core of the cable held in the housing and a first insulating layer wrapped on the conductive core through the interior of the housing.

3. The connector according to claim 1, wherein the bent portion is bent at an angle of 90 degrees.

4. The connector according to claim 1, further comprising a sheath sleeved over an outer peripheral surface of an end of the first tubular portion and adapted to be sleeved over an outer peripheral surface of the cable held in the housing.

5. The connector according to claim 4, wherein the sheath includes an annular wall sleeved over the outer peripheral surface of the first tubular portion and a cover portion partially closing an opening at the end of the first tubular portion, the cover portion defining a through hole adapted to receive the cable therethrough.

6. The connector according to claim 5, wherein an engaging opening is formed in the annular wall, and a protrusion is formed on the outer peripheral surface of the first tubular portion, the sheath is adapted to be fixed to the first tubular portion through engagement between the engaging opening and the protrusion.

7. The connector according to claim 5, further comprising a first clamping member accommodated in the sheath, having:

an annular portion adapted to:

be sleeved over the outer peripheral surface of the cable;

be positioned between the outer peripheral surface of the cable and an inner edge of the through hole of the cover portion of the sheath so as to clamp the cable; and abut against an inner surface of the cover portion of the sheath so as to prevent the first clamping member from being axially and outwardly detached from the sheath; and a flange extending radially outward from the annular portion.

8. The connector according to claim 7, further comprising a first seal positioned between an inner surface of the first tubular portion and the outer peripheral surface of the cable to seal an interior of the first tubular portion from an external environment of the connector, the flange of the first clamping member positioned axially between the inner surface of the cover portion of the sheath and the first seal.

9. The connector according to claim 2, furthering comprising shielding rings inside the first tubular portion, wherein:

the first tubular portion is adapted to permit the conductive core of the cable, the first insulating layer, a second insulating layer wrapped on the first insulating layer, and a shielding layer located between the first insulating layer and the second insulating layer to extend in the first tubular portion;

an extension of the second insulating layer is adapted to be terminated in the first tubular portion so that the shielding layer is exposed at a terminating portion of an end of the second insulating layer and folded to be sleeved over the outer peripheral surface of the second insulating layer; and the shielding rings are adapted to contact a portion of the shielding layer exposed at the terminating portion of the end of the second insulating layer, and an outer surface of the shielding ring is configured to contact the inner surface of the first tubular portion.

10. The connector according to claim 9, wherein the shielding rings include a first shielding ring and a second shielding ring adapted to be sleeved in the first shielding ring, the portion of the shielding layer exposed at the terminating portion of the end of the second insulating layer is adapted to be tightly clamped between the first shielding ring and the second shielding ring.

11. The connector according to claim 1, wherein:

an exterior of the second tubular portion is provided with a lug in which a mounting hole is formed; and the housing is adapted to be fixed to a motor housing by a fastener extending through the mounting hole and a corresponding mounting hole of the motor housing.

12. The connector according to claim 4, further comprising a heat shrinkable tube adapted to be sleeved over the outer peripheral surface of the end of the second tubular portion and an outer peripheral surface of a connection end of the cable exiting the second tubular portion so as to seal the interior of the second tubular portion from the external environment of the connector.

13. The connector according to claim 12, further comprising a connection terminal partially inserted into the heat shrinkable tube and adapted to be electrically connected with the connection end of the cable exiting the second tubular portion and to be electrically connected to a motor.

14. The connector according to claim 13, wherein the connection terminal defines a connection hole penetrating there through, the cable is adapted to be fixed to and electrically connected to the motor by a bolt extending through the connection hole.

15. The connector according to claim 7, further comprising a second clamping member and a third clamping member accommodated in the second tubular portion, the second clamping member and the third clamping member are adapted to be combined together to clamp a portion of the cable located inside the second tubular portion so as to fix the cable relative to the second tubular portion.

16. The connector according to claim 8, further comprising a second seal sleeved outside the second tubular portion and adapted to be fixed between the housing and a motor housing to prevent pollutants from entering an interior of the motor housing.

17. A connector assembly, comprising:

a pair of connectors, each connector having:

a housing in a form of a bent tube, including:

a first tubular portion;

a second tubular portion; and a bent portion connected between the first tubular portion and the second tubular portion, the first tubular portion and the second tubular portion extending at an angle of more than 0 degree and less than 180 degrees relative to each other, the housing adapted to hold a cable extending through an interior thereof, wherein the cable is bent within the bent portion; and a connection plate fixing the pair of connectors together.

18. The connector assembly of claim 17, wherein the connection plate fixes the pair of connectors such that the first tubular portion of one connector of the pair of connectors and the first tubular portion of the other connector form an angle relative to each other, and the second tubular portion of the one connector and the second tubular portion of the other connector are parallel to each other.

19. A connector assembly, comprising:

a pair of connectors, each connector having:

a housing in a form of a bent tube, including:

a first tubular portion;

a second tubular portion; and a bent portion connected between the first tubular portion and the second tubular portion, the first tubular portion and the second tubular portion extending at an angle of more than 0 degree and less than 180 degrees relative to each other, the housing adapted to hold a cable extending through an interior thereof, wherein the cable is bent within the bent portion;

a connection plate fixing the pair of connectors together such that the first tubular portion of one connector of the pair of connectors and the first tubular portion of the other connector are form an angle relative to each other, and the second tubular portion of the one connector and the second tubular portion of the other connector are parallel to each other; and a pair of cables extending through a respective one of the pair of housings, each cable including a conductive core and a first insulating layer wrapped on the conductive core extending through an interior of the housing so that the housing is electrically isolated from the conductive core by the first insulating layer.

20. A connector, comprising:

a housing in a form of a bent tube, including:

a first tubular portion;

a second tubular portion; and a bent portion connected between the first tubular portion and the second tubular portion, the first tubular portion and the second tubular portion extending at a non-zero relative to each other, the housing adapted to hold a cable extending through an interior thereof, wherein the cable is bent within the bent portion;

a sheath including an annular wall sleeved over the outer peripheral surface of the first tubular portion, and a cover portion, the sheath adapted to be sleeved over an outer peripheral surface of the cable held in the housing; and a first clamping member accommodated in the sheath and having an annular portion adapted to be sleeved over the outer peripheral surface of the cable, the annular portion positioned between the outer peripheral surface of the cable and an inner edge of a through hole of the cover portion of the sheath.

* * * * *